April 1, 1969  R. MacROBBIE  3,435,512
CABLE CONNECTORS AND RELATED METHODS AND STRUCTURES
Original Filed Aug. 2, 1963

United States Patent Office 3,435,512
Patented Apr. 1, 1969

3,435,512
CABLE CONNECTORS AND RELATED METHODS AND STRUCTURES
Robert MacRobbie, Brooklyn, N.Y., assignor to Richmond Screw Anchor Co., Inc., Brooklyn, N.Y.
Original application Aug. 2, 1963, Ser. No. 299,608, now Patent No. 3,262,724, dated July 26, 1966. Divided and this application Feb. 25, 1966, Ser. No. 530,169
Int. Cl. B21d *39/00;* H01r *43/00*
U.S. Cl. 29—517                                6 Claims

ABSTRACT OF THE DISCLOSURE

A method comprising forming a metal insert in the form of a tube and forming teeth on the interior of the tube, there being further formed in the tube diametrally opposed axially disposed slots which divide the tube into a base ring with axially extending legs. The tube is then hardened so that the legs flare outwardly and the tube is then forced into a bore in a sleeve, a cable being inserted into the tube and the sleeves being deformed around the tube to compress the legs together into gripping relationship with the cable to form a tapered wedge-like shape for the tube, to which the sleeve intimately conforms.

---

This invention relates to cable connector methods. This application is a divisional of my earlier filed copending application Ser. No. 299,608, filed Aug. 2, 1963 and issued as Pat. No. 3,262,724.

Although various arrangements are known by means of which physical connections can be made between cables, wire, ropes and so forth, on the one hand, and anchoring devices and the like, on the other hand, no suitable technique is available for making connections to stress-free stranded cable or like cables which have been work hardened.

The invention accordingly achieves, as one of its principal objects, the provision of an improved technique and structure especially adapted for making connections with cable and cable-like members of unusual hardness, it being understood that the methods and structures of the invention are also suitable for use with more conventional components.

In achieving the above and other of its objectives, the invention contemplates a method involving the use of a sleeve provided with a bore preferably extending only partially therethrough. In association with this sleeve there may be employed at least one, and preferably more, metal inserts in the form of tubes, the diameter of which would enable a press fit in the aforesaid bore.

According to a feature of the invention, the interior surfaces of the tubes are threaded, serrated or otherwise treated to form teeth therein.

According to a further feature of the invention, the tubes are each provided with diametrally opposed axial slots which divide the tubes each into a base ring having axially extending legs thereon, as will hereinafter be shown in greater detail.

It is preferred that these tubes be hardened so that the material thereof is harder than that of the above-noted sleeve. It has been discovered that upon such hardening the legs of each tube flare outwardly and consequently exceed the diameter of the bore in the above-noted sleeve so that the tubes may be rigorously positioned in said bore in axially abutting relationship.

According to still another feature of the invention there is employed a moisture lock or seal element in the form of a plastic retainer ring having thereon a protrusion which functions as a gauge to determine the depth to which the above-noted inserts are urged into the bore in the sleeve.

In accordance with a very important aspect of the invention the sleeve is deformed, such as by swaging, around the tubes prior to which a cable is inserted into the tubes so that the above noted legs are forced together in the gripping relationship with the cable and such that the tubes assume a wedge shape to which the sleeve is intimately conformed.

Advantageously, the above noted technique is admirably suited for use with stress-free or pre-stressed cables which are of unusually high Rockwell hardness due to the working to which such cable is subjected.

A further feature of the invention involves the provision of an external thread upon the above noted sleeve.

The above and further objects, features and advantages of the invention will be apparent from the following detailed description of some preferred embodiments as illustrated in the accompanying drawing in which.

Figure 8:
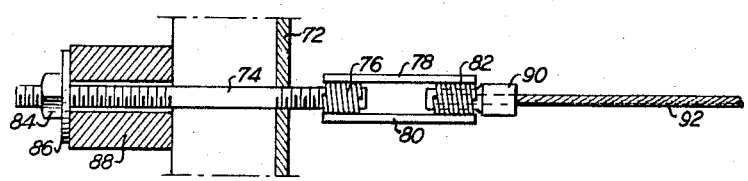
Figure 9:
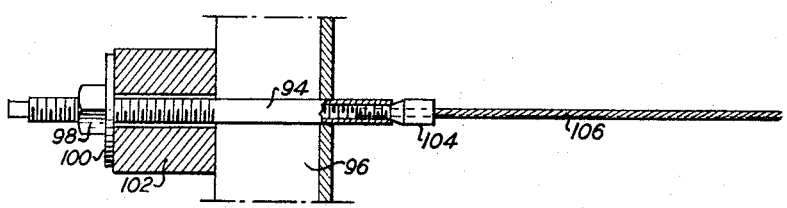

FIGURE 8 diagrammatically illustrates a type of form tie employing a connector of the invention; and FIGURE 9 diagrammatically illustrates a second type of form tie using a connector of the invention.

Figure 1:
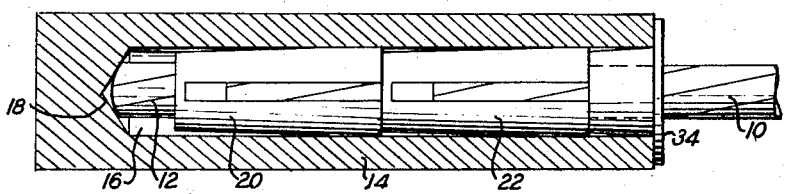
FIGURE 1 is a partial sectional view of components assembled on the end of a cable preparatory to forming a connector on the latter.

In FIG. 1 is illustrated generally a 7-strand cable 10 of intertwined strands and preferably of the stress-free or prestressed type such that its Rockwell hardness has been substantially increased due to the processing which said cable has been subjected to. The Rockwell hardness (scale C) of this cable may, for example, run to an index of 60 although as will become apparent hereinafter, the invention is also suitably applicable to softer material as well as harder materials.

Mounted on the end 12 of cable 10 is a cylindrical sleeve 14 provided with an axial bore 16 conveniently terminated in a conical end portion 18.

Figure 3:
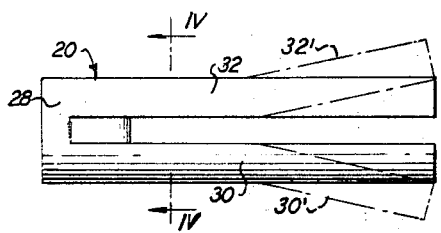
FIGURE 3 is a side view of an insert employed in the structure of FIGS. 1 and 2, a deforming which occurs during processes being shown in phantom lines.
Figure 4:
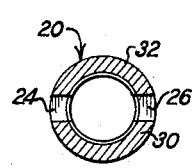
FIGURE 4 is a sectional view taken along line IV—IV of FIG. 3.

Accommodated within the bore 16 are two inserts 20 and 22, insert 20 of which is shown in greater detail in FIGS. 3 and 4 by way of example.

In the latter said figures it appears that each insert is provided with a pair of diametrally opposed axial slots 24 and 26 which effectively divide each insert into a base ring 28 and two opposed axially extending legs 30 and 32.

The sleeve 14 is preferably fabricated of a carbon steel. The inserts 20 and 22 are preferably fabricated of a cold rolled steel which is fully pack hardened. A hardening of inserts 20 and 22 is effected following the forming of slots 24 and 26 therein. Legs 30 and 32, it has been found, tend to flare outwardly and assume the position indicated at 30' and 32'.

The bore 16 is of a predetermined diameter. The outer diameter of ring 28 is preferably such as to permit a press fit of the ring into said bore. The expanding outwardly of legs 30 and 32 results in that the inserts need be positively forced into said bore so that a very precise fitting of the same in said bore and maintaining of the inserts in position is possible. This, however, is not the primary use of the aforesaid axial slots as will hereinafter become apparent.

The inserts 20 and 22 are forced into bore 16 to a determinable depth by the use of a retainer ring 34 which performs a plurality of functions.

Figure 6:
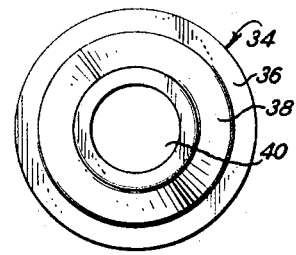
FIGURE 6 is an end view of said retainer ring.
Figure 5:
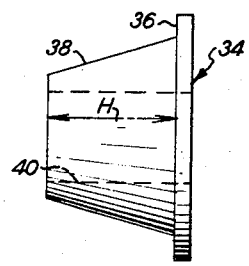
FIGURE 5 is a side view of a retainer ring employed in the structure of FIGS. 1 and 2.

As shown in FIGS. 5 and 6, retainer ring 34 comprises a flat annular flange 36 atop of which is provided a frustoconical protrusion 38 through which extends a center hole 40. Protrusion 38 is of a height H which determines the extent to which the inserts are forced into bore 16 in view of the axially abutting relationship into which retainer ring 34 is forced in relation to the outermost of said inserts.

In addition, and as will be shown, retainer ring 34 is caused to assume a hermetically sealed relationship with the cable 10 and with the sleeve 14 so that the retainer ring operates as a moisture seal or lock preventing moisture from penetrating into the interior of bore 16. Further, the retainer ring 34 is preferably fabricated of a plastic such as polyethylene and in practice is suitably color coded for purposes of identifying the structure into which it is incorporated.

Figure 2:
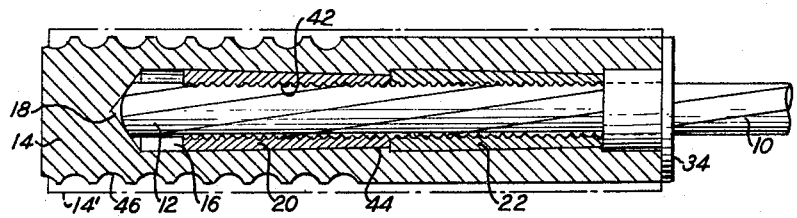
FIGURE 2 is a corresponding view illustrating the connector after forming operations have been performed thereon.

With inserts 20 and 22 coaxially aligned and inserted in bore 16 in concentric relationship with sleeve 14 and with retainer ring 34 suitably plugged into the outer extremity of said bore, the arrangement of FIG. 1 is ready for being finished in the form indicated in FIG. 2. This is accomplished by deforming sleeve 14 from its original shape shown in phantom lines at 14′ in FIG. 2 to the shape down in solid lines. This operation is preferably effected by swaging or by any other conventional cold forging operation.

The ring 28 (see FIG. 3), being harder than the cable 10 and the material from which sleeve 14 is formed, effectively maintains its original shape and dimension. Due to slots 24 and 26 (FIG. 4) legs 30 and 32 of inserts 20 and 22 are compressed towards one another so that each insert assumes a tapered wedge shape.

Moreover, each of the inserts or tubes 20 and 22 is provided with internal teeth 42 by means of having been provided with an internal thread or being otherwise serrated. These teeth, which are harder than the material of cable 10, are forced into the latter therefore providing an extremely effective grip.

In addition, the material of sleeve 14 is caused by the deforming operation to conform intimately to the shape assumed by the inserts. The portions particularly indicated by way of example at 44 form an annular step which absolutely insures against relative displacement between the inserts and sleeve. Effectively therefore a monolithic structure is provided involving as essential components thereof the cable, said inserts and said sleeve.

The retainer ring 34 is at the same time deformed to form the aforenoted hermetic seal. Its plastic material is, as a result of the deformation of sleeve 14, brought into close engagement with cable 10 and said sleeve.

Sleeve 14 now has a greatly reduced diameter as is apparent from a comparison of the solid and phantom lines in FIG. 2 and is ready for the provision of means through which engagement can be made with cable 10. Said means takes the form in FIG. 2 of an exterior thread 46 which may be provided on the sleeve for approximately half its length by methods and techniques which are conventional per se.

Figure 7:
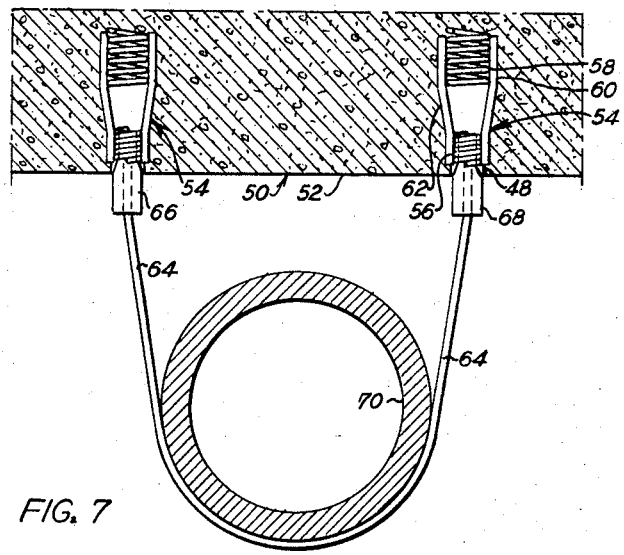
FIGURE 7 is a diagrammatical illustration of a hanger employing a cable having connectors thereon slightly modified from the connector illustrated in FIGS. 1 and 2.

A hanger devised from a cable provided with connectors of the invention appears in FIG. 7 wherein a slight modification of said connectors is illustrated due to the inclusion of a taper 48.

According to FIG. 7, there is provided an anchor base 50 of concrete or the like, having a bottom horizontal surface 52 in which appears two threaded receptacles 54 spaced apart a suitable distance.

Said receptacles consist of a coil 56 constituting a thread and a coil 58 connected by wire struts 60 and 62 welded thereto.

A U-shaped loop 64 of pre-stressed cable is provided at the extremities thereof with connectors 66 and 68 threaded as noted above, the threaded portions being accommodated in the receptacles 54. A pipe or conduit 70 or the like may be thusly suspended along with loop 64 from anchor base 50.

A vertical support 72 is illustrated in FIG. 8, a bolt 74 extending horizontally therethrough and threadably engaging a coil 76 connected by struts 78 and 80 to thread coil 82. Bolt 74 is held by a nut 84 and washer 86 in position in cooperation with a spacer 88.

A threaded connector 90 affixed at the end of cable 92 threadably engages in thread coil 82 and connects cable 92 rigidly to vertical support 72. Cable 92 may be readily placed under tension by adjustment of nut 84.

A variation of FIG. 8 is illustrated in FIG. 9 wherein a horizontal sleeve 94 passes through vertical support 96 and is held in position by a nut 98 cooperating with washer 100 and a spacer 102. Sleeve 94 is provided with an interior thread engaging threaded connector 104 mounted on a cable 106. Cable 106 may be placed under suitable tension by adjustment of nut 98.

There will now be obvious to those skilled in the art many modifications and variations of the method set forth above. These modifications and variations will not, however, depart from the scope of the invention if defined by the following claims.

What is claimed is:

1. A method for using a sleeve provided with a bore, said method comprising forming a metal insert in the form of a tube, treating the interior of the tube to form teeth therein, forming in the tube diametrally opposed axial slots which divide the tube into a base ring with axially extending legs, hardening the tube so that it is harder than the sleeve and such that the legs initially flare outwardly and exceed the diameter of said bore, forcing the tube into said bore, inserting a cable through said tube, the tube having a hardness greater than that of the cable, and deforming said sleeve around said tube and cable thereby compressing the said legs together into gripping relationship with said cable and thereby form a tapered wedge like shape for said tube to which said sleeve intimately conforms.

2. A method comprising forming a sleeve of a metal of predetermined hardness with a blind axial bore of determinable diameter, forming two metal inserts in the form of tubes, the diameter of which would enable a press fit in said bore, threading the interior of the tubes to form teeth therein, forming in each of the tubes diametrally opposed axial slots which divide the tubes each into a base ring with axially extending legs, hardening the tubes so that they are harder than the first said metal and such that the legs flare outwardly and exceed said diameter, forcing the tubes sequentially into said bore in axially abutting relation, depressing the tubes a determinable depth into said bore with a plastic retainer ring having a center hole therein, inserting a stress free steel cable through said hole and tubes, the hardened tubes being harder than said cable, swaging said sleeve around said tubes and cable thereby compressing the said legs together into gripping relationship with said cable and such that said tubes assume a wedge shape to which said sleeve intimately conforms, and externally threading said sleeve.

3. A method comprising forming a metal sleeve with a blind axial bore, forming two metal inserts in the form of tubes, forming axial slots in each of the tubes, placing the tubes sequentially into said bore in abutting axial alignment, one behind the other and facing in the same direction, inserting a cable through said tubes, the tubes having a hardness greater than that of the sleeve and cable and deforming said sleeve around said tubes and cable to compress said tubes into gripping relationship with said cable and such that said tubes each assume a tapered wedge shape to which said sleeve intimately conforms, whereby an annular step is formed in the bore of said sleeve at the location where said tubes are in abutment, and externally threading said sleeve.

4. A method comprising forming a metal sleeve with a blind axial bore, forming two metal inserts in the form of tubes adapted for being press fit in said bore, forming teeth in the interior of the tubes, forming in each of the tubes diametrally opposed axial slots which divide the tubes each into a base ring with axially extending legs, hardening the tubes so that they are harder than the metal sleeve, placing the tubes sequentially into said bore in abutting axial alignment one behind the other and facing in the same direction, inserting a cable through said tubes, and deforming said sleeve around said tubes and cable, thereby compressing said legs together into gripping relationship with said cable such that each of said tubes assumes a tapered wedge shape to which said sleeve intimately conforms, whereby an annular step is formed in the bore of said sleeve at the location where said tubes are in abutment.

5. A method comprising forming a sleeve of a metal of predetermined hardness with a blind axial bore of determinable diameter, forming two metal inserts in the form of tubes, the diameter of which would enable a press fit in said bore, threading the interior of the tubes to form teeth therein, forming in each of the tubes diametrally opposed axial slots which divide the tubes each into a base ring with axially extending legs, hardening the tubes so that they are harder than the metal sleeve and such that the legs flare outwardly and exceed said diameter, forcing the tubes sequentially into said bore in axially abutting relation with the legs of the first inserted tube abutting the base ring of the subsequently inserted tube, inserting a stress-free steel cable through said tubes, the hardened tubes being harder than said cable, and swaging said sleeve around said tubes and cable thereby compressing the said legs together into gripping relationship with said cable and such that said tubes assume a tapered wedge shape to which said sleeve intimately conforms, whereby an annular step is formed in the bore of said sleeve at the location where said tubes are in abutment.

6. A method comprising forming a sleeve of a metal of predetermined hardness with a blind axial bore of determinable diameter, forming two metal inserts in the form of tubes, the diameter of which would enable a press fit in said bore, threading the interior of the tubes to form teeth therein, forming in each of the tubes diametrally opposed axial slots which divide the tubes each into a base ring with axially extending legs, hardening the tubes so that they are harder than the metal sleeve and such that the legs flare outwardly and exceed said diameter forcing the tubes sequentially into said bore in axially abutting relation with the legs of the first inserted tube abutting the base ring of the subsequently inserted tube, depressing the tubes a determinable depth into said bore with a plastic retainer ring having a center hole therein, inserting a stress-free steel cable through said hole and tubes, the hardened tubes being harder than said cable, and swaging said sleeve around said tubes and cable thereby compressing the said legs together into gripping relationship with said cable and such that said tubes assume a tapered wedge shape to which said sleeve intimately conforms, thereby an annular step is formed in the bore of said sleeve at the location where said tubes are in abutment.

References Cited

UNITED STATES PATENTS

| 1,220,326 | 3/1917 | Fargo | 287—126 X |
| 1,750,790 | 3/1930 | Bessonett | 285—342 X |
| 2,446,542 | 8/1948 | MacInnes | 29—517 |
| 2,894,426 | 7/1959 | Rapata | 29—526 |
| 2,958,929 | 11/1960 | Vineberg et al. | 29—516 |
| 3,033,600 | 5/1962 | Drysdale | 29—517 X |
| 3,052,750 | 9/1962 | Cobaugh | 29—516 |

FOREIGN PATENTS 1,337,359   7/1961   France.

ANDREW R. JUHASZ, *Primary Examiner.*

G. WEIDENFELD, *Assistant Examiner.*

U.S. Cl. X.R.

29—525, 628